Jan. 16, 1945. R. E. BESWICK 2,367,480

NUT FOR QUICK ATTACHMENT

Filed Aug. 12, 1940 2 Sheets-Sheet 1

Inventor:
Robert E. Beswick
By his Attorney: Walter Gunow

Jan. 16, 1945.  R. E. BESWICK  2,367,480
NUT FOR QUICK ATTACHMENT
Filed Aug. 12, 1940  2 Sheets-Sheet 2

Inventor:
Robert E. Beswick
By his Attorney: Walter Gunn

Patented Jan. 16, 1945

2,367,480

UNITED STATES PATENT OFFICE 2,367,480

NUT FOR QUICK ATTACHMENT

Robert Eardley Beswick, Marple, England

Application August 12, 1940, Serial No. 352,320
In Great Britain August 14, 1939

4 Claims. (Cl. 85—32)

This invention relates to a nut for quick action attachment and a spanner or key therefor.

In attachments for the temporary holding of objects or materials that have to be machined or otherwise operated upon, the use of the ordinary screw threaded bolt and nut is restricted by reason of the comparative slowness or operation that results from having to make a number of turns in order to screw the nut on and off the projecting part of the bolt.

One object of my invention is to provide a nut which, instead of having to be screwed up and down the whole length of the projecting part of the bolt, may be pushed freely along the thread in either direction and tightened or released when in position by a part turn only.

Another object of the invention is an improved spanner or key specially constructed to facilitate quick action of applying and/or removing the improved nut.

According to the invention, the improved nut comprises a plurality of segments collectively forming an internally threaded nut, a spider-like frame or cage having a leg for each segment and to the ends of which the segments are secured so that they can separate radially to disengage from a bolt, and a sleeve slidably mounted on the segments and on the frame and positively retained thereon, and arranged for embracing or releasing the segments according to its position.

According to a preferred form of the invention the spider-like frame or cage provides spring pressure acting in a direction to separate the segments.

According to a further feature of the invention an improved spanner or key is provided having resilient means by which pressure may be applied axially to the spider-like frame or cage of the nut during its application to a bolt.

Figure 1:
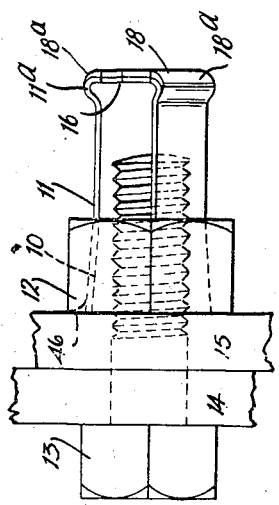
Fig. 1 is an external view of one example of quick acting nut made in accordance with this invention.

In one form of the invention as illustrated in Figs. 1 to 4 the nut consists of an internal threaded part formed of three segments 10, each attached to one leg 11, of a spring spider-like frame or cage so that, in their unrestrained condition they are sprung apart (see Fig. 4) sufficiently to allow of their being passed freely over the threaded portion of a bolt. The segments 10 when closed together collectively form a hexagonal nut-like assembly. An external sleeve 12 is provided free to slide over the frame or cage 11 having a complementary hexagonal inner face to engage the segments and of such size as to constrain the segments together when it is pushed over them so that their threaded surfaces close in to form parts of a continuous helix of suitable pitch and form to engage the thread of the bolt. The surfaces of engagement between the external nut and the segments, i. e. the outer facets of the segments and the complementary inner face of the sleeve are slightly tapered to facilitate the assembly and withdrawal of the former and advantage is taken of the radial reaction of the flanks of the thread when the nut is tightened to force the segments outward against the external sleeve and thus to bind the whole composite nut securely against the loosening effects of vibration. As a result of this the more tightly the parts to be connected are forced together by the final tightening of the nut the more tightly are the component parts of the nut itself bound together. In Fig. 1 the nut is shown tightened onto a bolt 13 and clamping together two plates 14 and 15.

A suitable angle of taper for the complementary engaging surfaces of the segments and sleeve is found to be about 5 degrees included angle. This taper facilitates the opening and closing of the segments and while a quick taper accentuates such action it is essential that, considering the material of the segments and sleeve and of the bolt to which it is to be fitted, and considering also the possibility of the presence of an oil film and submission to vibration, the angle or taper should be less than the critical angle, that is to say the angle must be smaller than that which would permit sliding movement of the sleeve to arise from outward pressure on the segments whether obtained from the screw thread and/or from the spring of the spider and whether or not there is oil on the surfaces or the presence of vibration.

The spider-like frame or cage is so designed as to retain the external sleeve from coming entirely apart from the rest of the device and in its correct location for sliding over the segmented nut.

In construction, the three segments 10 of the nut each have one complete facet 10a of the hexagon and half facet 10b on each side. The complete facet 10a is grooved to receive the end of the leg 11 of the spider-like frame, which latter is made of a stamping of spring steel having a flat base-like portion 16 which may be washer-like with a central hole 17 which is of clearance size for the bolt. The three legs 11 radiating from this washer-like part are first of all bent to form a hump 11a adjacent to the base, which provides additional spring effect and serves also to reduce the possibility of fracture and also as a stop to prevent the sliding sleeve 12 from passing over the base portion. The legs of the spider-like frame are of the same width as the facets 10a and as the corresponding facets within the sleeve, or of sufficient width to locate and guide the sleeve on to the segments. The ends of the legs 11 are arranged to fit into the grooves in the facet 10a of their respective segments and are secured therein by any suitable means as by brazing, riveting, welding or soldering. The base part 16 of the spider-like frame is further strengthened by a second stamping 18 of spring steel secured thereto by welding, riveting, brazing or other suitable means and having short extensions 18a which overlie the first part of the humps 11a of the legs in the manner of a leaf spring. The length of the legs 11 is such that the sleeve can be withdrawn beyond the segments and so that the taper within the sleeve, if any, and/or the curvature or spring of the legs is sufficient to allow the segments to separate for the axial application and removal of the same from a bolt.

Figure 5:
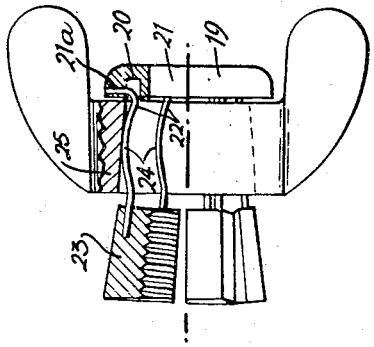
Fig. 5 shows a modified construction of the nut.
Figure 3:
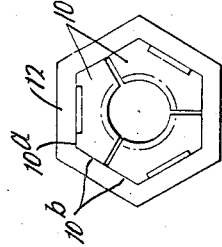

In an alternative construction, as shown in Fig. 5, the base part of the spider-like frame may consist of a washer-like turning 19 in one end face of which is formed an annular groove 20 near the central hole 21, and into which groove are made six holes 21a radially directed from the outer periphery. The spring members forming the legs in this case consist of pairs of bent spring wires 22, each having one end fitted into one of these holes 21a by insertion from the groove and secured therein by soldering or other suitable means. The ends of the springs 22 are suitably secured in holes drilled in the ends of the segments 23 and the springs are arched at 24 to contact and guide the sleeve 25 in the same way as the flat blade-like legs 11 of the example above described.

Figure 7:
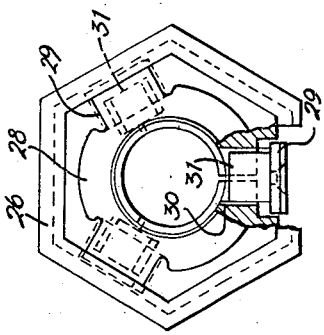
Fig. 7 is a top plan view of Fig. 6.
Figure 6:
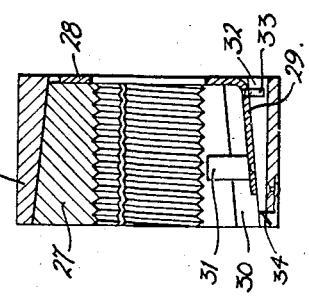
Fig. 6 shows a further modified construction.
Figure 2:
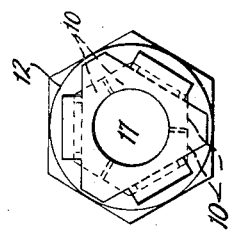
Figs. 2 and 3 are end views from opposite ends.

In another example as shown in Figs. 6 and 7 and where the nature of the work demands that the nut shall be short, the sleeve 26 is made separable from the segments 27 and the spider-like frame holding the segments together has its base 28 immediately against the outer face of the segments 27. The legs 29 of the frame are located in slots 30 in the sides of the segments of sufficient depth to permit their separation to clear the thread of the bolt whilst at their inner ends the legs of the spider-like frame are fitted with tenons 31 located in radially directed holes in the segments. In order to prevent separation of the parts, the sleeve 26 is formed with an axially directed groove 32 to be engaged by a pin 33 at the base end of each leg 29 of the spider-like frame and at its forward end the sleeve is provided with a spring loaded detent or stop 34 so that if necessary the sleeve may be separated from the assembly of the segments and its spider-like frame and when the latter have been placed in position the sleeve may also be applied and pressed home over the segments, to cause their engagement with the thread when the whole may be turned with a key or spanner to tighten the assembly on the bolt like an ordinary nut. For release it is only necessary to loosen the nut, when the parts may again be separated or removed, or they may be removed together if there is sufficient space for doing so. In this form also, the sleeve may be shaped as a wing nut for hand operation.

Figure 4:
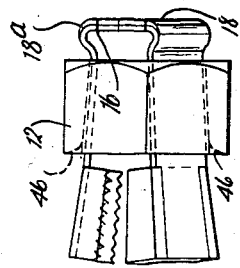
Fig. 4 is a side elevation showing the nut with the segments in the open or released position.
Figure 8:
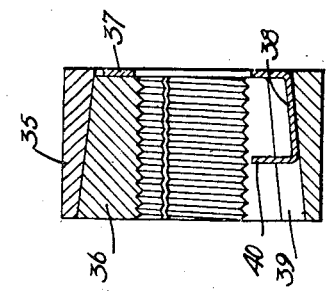
Fig. 8 shows a modification of Fig. 6.

In a further example of the invention as shown in Fig. 8 and which is a modification of the short nut shown in Figs. 6 and 7, the sleeve 35 is made separable from the segments 36 and the spider-like frame holding the segments together has its base 37 immediately against the outer face of the segments 36. The legs 38 of the frame are located in slots 39 in the sides of the segments of sufficient depth to permit their separation to clear the thread of the bolt, whilst at their inner ends the legs 38 have their ends bent in as tongues 40 which are located in radial slots in the segments. The sleeve may, if required, be separated from the segments. The nut will be usable exactly as described for the example illustrated in Figs. 6 and 7.

In operation of any of the forms of the device above described it is only necessary to push the segmented nut over the bolt until it makes contact with the surface to be clamped and then to push the external sleeve over the segmented nut so far as may be necessary to close the segments to their working position. In so doing a slight rotational movement in a counterclockwise direction assists proper engagement of the threads of the nut with the threads of the bolt. By the subsequent application of a rotational motion to the external sleeve the whole device may now be screwed along the bolt the further short distance necessary to effect the desired clamping or tightening of the nut. To undo the nut, a small rotation but in the opposite direction loosens the segments from their expansive engagement with the external sleeve so that the sleeve can be freely withdrawn to the end of the spider-like frame when the segmented nut assembly can be slipped off the end of the bolt.

Figure 9:
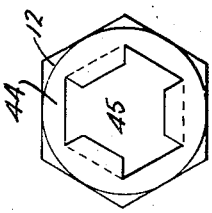
Fig. 9 shows an attachment for use in some forms of construction of the improved nut.

The complementary engaging walls of the segments and sleeve need not necessarily be tapered, but may be parallel-sided provided the legs of the spider-like frame are long enough to permit the sleeve to move far enough back for the same to disengage from the segments and allow them to separate sufficiently to clear the threads of the bolt. In such cases it is desirable that the legs should originate from the inner periphery of the base portion of the frame in order that their greater angle of spray when so arranged shall permit a sufficiently wide opening of the segments without unduly lengthening the frame. The legs may, further, be curved in such a manner as to facilitate the attainment of this object. In such cases the segments, or the sleeve, would preferably be provided with some means to retain the sleeve from sliding off the ends of the segments. For that purpose a washer 44 (Fig. 9) may be secured to the upper face of the sleeve provided with internal projections 45 so arranged as to avoid the legs of the spider-like frame but to engage the upper ends of the segments. In all cases engagement of the sleeve with the segments may be facilitated and the necessary length of the spring legs reduced by rounding the inner edges of the bottom of the sleeve as shown at 46 in Figs. 1 and 4.

Figure 10:
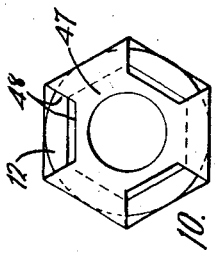
Fig. 10 shows a further modification.

Instead of the spider-like frame having spring legs, the opening and closing movement of the segments could be possibly effected by forming legs to the correct inclination corresponding to the taper of the facets or the opening movement required and by fixing to the outer face of the sleeve as illustrated in Fig. 10 a star-like washer 47 shaped so as to leave apertures 48 in which the legs of the frame are located. Thus the sliding movement of the sleeve will result in positive opening or closing of the segments. In all forms of the invention the sleeve may be provided with projections as in a "wing nut" for hand tightening.

As already stated, for these nuts when not arranged for hand tightening, the invention includes also a special key or spanner to facilitate quick action of applying and/or removing the nut.

Figure 11:
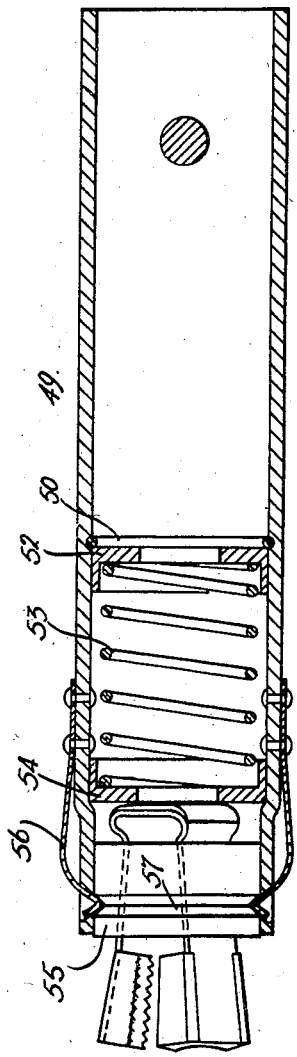
Fig. 11 is a longitudinal sectional view of a key or spanner with a nut held therein.

In one example of this feature of the invention, as illustrated in Fig. 11, a tubular box operating member is provided having a cylindrical main portion 49, the end of which is shaped to fit a hexagonal nut in the usual manner. Within the barrel of the operating member is formed a shallow annular groove adapted to receive a spring ring 50. Against the ring 50 is located a thrust washer 52 to form an abutment for a coil spring 53 located within the barrel of the operating member, the hole in the thrust washer being of clearance size for the bolt. If preferred this washer may be secured by screws or rivets or in any other suitable way. The hexagonal end of the spanner forms a shoulder in the barrel against which a similar thrust washer 54 is seated to support the other end of the coiled spring 53.

In operation, as applied to the nut described in the first example, it will be seen that the nut can be fitted to the spanner with its sleeve 55 located in the hexagonal shaped end to receive the same, and in this position the outermost thrust washer 52 will be located against the base of the spider-like frame. Spring detents 56 are provided in the sides of the spanner to engage grooves 57 in the faces of the sleeve to hold the same in the end of the operating member whilst the nut is being applied to a bolt. To apply the nut the same is then brought over the end of the bolt and pressure applied to the spanner to push the nut down on to the bolt. Any resistance to this movement due to the partial engagement of the threads in the segments with the bolt, will be counteracted by the coil spring 53 within the spanner, so that the sleeve 55 does not move forward on to the segments until the segments have been substantially pushed home on the bolt against the surface which they are to engage. Next, by a slight rotary movement combined with further downward pressure on the spanner, the sleeve is brought into engagement with the segments to close the same on to the bolts, the rotary movement ensuring that the threads of the segments do not fail to engage properly with the threads of the bolt. When the sleeve has been pushed fully down and whilst any pressure is still maintained on the spanner, the same is given a further rotation to tighten the nut on its bolt against the complementary working surface. A slight outward pull is all that is required now to remove the spanner from the nut. Similarly for removing such a nut the first operation is to apply the spanner and push it down on to the nut until its detents engage with the sleeve thereof. A slight rotary movement of the spanner will release the nut when the tension of the spring in the spanner will draw back the sleeve, and the nut as a complete assembly may be pulled off the bolt and subsequently removed or released from the spanner. As will be obvious the improved spanner considerably accelerates the application of the nut to a bolt.

The invention, as regards the construction of the spanner, is obviously not limited to all the details of construction of the example above described, some of which may be modified without departing from the nature of the invention.

What I claim is:

1. An improved nut comprising a plurality of segments collectively forming an internally threaded nut having externally tapered facets, a spider-like frame consisting of an initially flat piece of resilient sheet metal and comprising a flat transverse base portion and a longitudinally disposed resilient leg for each of the segments and to the ends of which the segments are secured so that they can separate radially to disengage from a bolt, a sleeve having complementary tapered internal facets and slidably mounted on the segments and on the frame, said legs being provided at their outer ends with outwardly curved bends forming humps and providing a stop for limiting the outward sliding movement of the sleeve and increasing spring action and avoiding fracture, and a second piece of resilient sheet metal secured to the base portion of the frame and extended over the bends of the legs and cooperating with the same to form a leaf spring.

2. An improved nut comprising a plurality of nut segments collectively forming an interiorly threaded nut and having angularly related faces forming a tapered polygonal exterior, a spider-like frame constructed of resilient sheet metal and comprising a flat transverse base portion and a resilient leg for each nut segment and to the ends of which the segments are secured so that they will separate radially to disengage from a bolt, and a sleeve slidably mounted on the nut segments and on the frame and having a tapered polygonal interior conforming to the tapered polygonal exterior of the nut segments, whereby it is interlocked with the same against relative rotary movement, said sleeve being also provided with a polygonal wrench receiving exterior and adapted through its sliding movement to embrace and release the nut segments.

3. An improved nut comprising a plurality of segments collectively forming an internally threaded nut with externally tapered facets, a spider-like frame or cage having a resilient leg for each segment and to the ends of which the segments are secured, said legs being sprung so that the segments are initially separated radially to pass over the threads of a bolt, and a sleeve, having a polygonal wrench receiving exterior and internal complementary facets, slidably mounted on the segments and on the legs of the frame for embracing or releasing the segments according to its position thereon.

4. An improved nut comprising a plurality of segments collectively forming an internally threaded nut with externally tapered facets, a spider-like frame or cage having a resilient leg for each segment and to the ends of which the segments are secured, said legs being sprung so that the segments are initially separated radially to pass over the threads of a bolt, and a sleeve, having a polygonal wrench receiving exterior and internal complementary facets, slidably mounted on the segments and on the legs of the frame for embracing or releasing the segments according to its position thereon, and means for retaining the sleeve of the frame or cage.

ROBERT EARDLEY BESWICK.